J. H. WENZLICK.
FASTENER FOR SECTIONAL COAL AUGER NUTS.
APPLICATION FILED MAY 3, 1916.
1,286,859.
Patented Dec. 3, 1918.
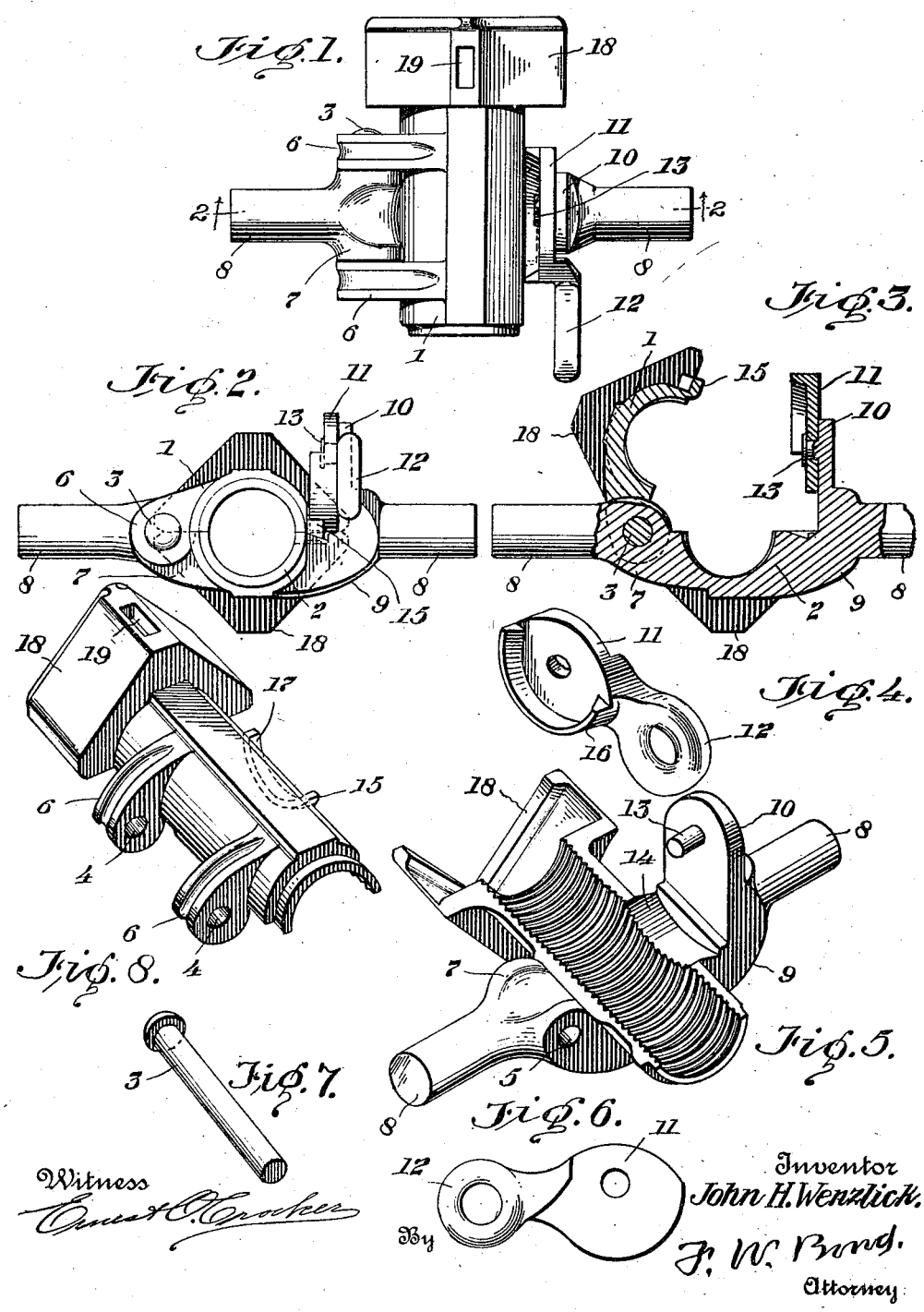

UNITED STATES PATENT OFFICE.

JOHN H. WENZLICK, OF CANAL FULTON, OHIO, ASSIGNOR TO THE FULTON TOOL WORKS, OF CANAL FULTON, OHIO, A CORPORATION OF OHIO.

FASTENER FOR SECTIONAL COAL-AUGER NUTS.

1,286,859.     Specification of Letters Patent.     Patented Dec. 3, 1918.

Application filed May 3, 1916. Serial No. 95,035.

*To all whom it may concern:*

Be it known that I, JOHN H. WENZLICK, a citizen of the United States, residing at Canal Fulton, in the county of Stark and State of Ohio, have invented a new and useful Fastener for Sectional Coal-Auger Nuts, of which the following is a specification.

My invention relates to improvements in fasteners for sectional coal-auger nuts in which means are provided for securely fastening the sections of the nut and holding the same in such position that the drill or auger can be fed as the same is rotated.

The objects of the present invention are, first, to securely hold the sections together; and second, to hold the sections in such a manner that there can be no relative lateral movement as between the sections.

These objects, together with other objects readily apparent to those skilled in the art, may be attained by the construction illustrated in the accompanying drawings, although the invention may be embodied in other forms, the construction illustrated being chosen by way of example.

In the accompanying drawing:

Figure 1 is a top view.

Fig. 2 is a section on line 2—2, Fig. 1.

Fig. 3 is a transverse section showing the members open.

Fig. 4 is a detached view of the locking cam.

Fig. 5 is a detached perspective view of the trunnion member or section.

Fig. 6 is a detached view of the locking cam showing the opposite side from that shown in Fig. 4.

Fig. 7 is a detached view of the hinged pin.

Fig. 8 is a detached perspective view of the hinged section.

Similar numerals of reference indicate corresponding parts throughout the several figures of the drawing.

In the accompanying drawing, 1 represents the hinged nut section or member and 2 the trunnion member which members are hinged together, preferably by an ordinary hinge pin 3 located through apertures 4 and 5, the apertures 4 formed in the connecting flanges 6 and the aperture 5 formed in the trunnion head 7. The section 2 is provided with the trunnions 8, which are located in alinement with reference to each other and upon opposite sides of the section 2, said trunnions being for the purpose of properly journaling the device in the usual way. Upon one side of the section 2 is located the head 9, which head is provided with the upward extending flange 10, to which flange is pivotally connected the locking cam 11, said locking cam being provided with the operating handle 12. The locking cam is properly connected by means of the stud 13 or its equivalent.

At the base of the flange 11 is located the recess 14, the upper face of which is concaved and is so formed for the purpose of receiving the under convexed surface of the flange 15 formed upon the hinged member 1. In use when it is desired to lock the members together so that they will properly engage the ordinary screw threaded drill shank the hinged member 1 is placed in the position illustrated in Figs. 1 and 2 and when so placed the flange 15 will be seated in the recess 14, after which the locking cam 11 is rotated so as to bring the cam face 16 in clamping contact with the upper concaved face 17 of the flange 15. In devices of the character described, it is of importance that there be no relative lateral movement as between the cover members or sections 1 and 2 and in order to prevent this movement the recess 14 is provided with a concaved surface and the flange 15 with a convex surface so that when the flange 15 is seated in the recess 14 and the locking cam brought into locking position there can be no sliding or lateral movement whatsoever.

It will be understood that both of the nut sections 1 and 2 should be provided with semi-circular screw threaded grooves which are for the purpose of providing proper means for feeding the screw threaded drill shank or auger through the sections or members by rotating the screw threaded shank. This feature is old and has nothing to do with the present invention. The screw threaded shank is not illustrated, owing to the fact that any one skilled in the art to which this invention pertains will readily understand that a screw threaded shank must be employed.

In some instances a square flange is formed upon the head and in that event the sections 1 and 2 should be provided with the corresponding shaped sections 18 and for the purpose of allowing sand to escape from the corners an aperture 19 may be formed. These features however have nothing to do with the invention illustrated and claimed.

I claim:

In a fastener for sectional coal auger nuts, the combination of nut sections hinged together, one of said sections provided with trunnions upon its opposite sides and a recess provided with a concaved face, a flange located adjacent the concaved faced recess, the other hinged nut section provided with a convexed and concaved faced flange adapted to be seated in the recess, a pivoted locking cam carried by the flange adjacent the concaved faced recess and located above said recess and to be seated upon the concaved face of the flange seated in the recess, said cam provided with a contact flange and an operating handle located at one side of the cam.

In testimony that I claim the above I have hereunto subscribed my name.

JOHN H. WENZLICK.

Copies of this patent may be obtained for five cents each, by addressing the "Commissioner of Patents, Washington, D. C."